United States Patent
Mitose et al.

(10) Patent No.: US 10,605,993 B2
(45) Date of Patent: Mar. 31, 2020

(54) OPTICAL CONNECTION COMPONENT

(71) Applicant: Sumitomo Electric Industries, Ltd., Osaka-shi (JP)

(72) Inventors: Yuuichi Mitose, Yokohama (JP); Tetsuya Nakanishi, Yokohama (JP); Takashi Sasaki, Yokohama (JP); Naoki Matsushita, Yokohami (JP)

(73) Assignee: Sumitomo Electric Industries, Ltd., Osaka-shi (JP)

( * ) Notice: Subject to any disclaimer, the term of this patent is extended or adjusted under 35 U.S.C. 154(b) by 0 days.

(21) Appl. No.: 16/235,003

(22) Filed: Dec. 28, 2018

(65) Prior Publication Data

US 2019/0137693 A1    May 9, 2019

Related U.S. Application Data (60) Division of application No. 15/868,249, filed on Jan. 11, 2018, now abandoned, which is a continuation of
(Continued)

(51) Int. Cl.
*G02B 6/36* (2006.01)
*G02B 6/44* (2006.01)
(Continued)

(52) U.S. Cl.
CPC ......... *G02B 6/3616* (2013.01); *G02B 6/3636* (2013.01); *G02B 6/4478* (2013.01);
(Continued)

(58) Field of Classification Search
CPC .............................. G02B 6/3636; G02B 6/3616
See application file for complete search history.

(56) References Cited

U.S. PATENT DOCUMENTS 5,138,676 A * 8/1992 Stowe .................. G02B 6/2552
385/123
5,517,590 A    5/1996 Auborn et al.
(Continued)

FOREIGN PATENT DOCUMENTS

CN          1975486 A     6/2007
CN        101852898 A    10/2010
(Continued)

OTHER PUBLICATIONS

Kim et al., "Fictive temperature of silica glass optical fibers—reexamination," Journal of Non-Crystalline Solids, vol. 286, 2001, pp. 132-138 [Cited in Parent].
(Continued)

*Primary Examiner* — Omar R Rojas
(74) *Attorney, Agent, or Firm* — Baker Botts L.L.P.; Michael A. Sartori (57) ABSTRACT

The present embodiment achieves effective height reduction of an entire optical connection component constituted by a bent optical fiber and a fiber fixing component. The fiber fixing component includes a first portion and a second portion which constitute the holding portion in a state of being arranged in a manner interposing an installation plane in order to hold one of non-bent sections positioned at both ends of a bent portion in a state where the one of non-bent sections is arranged on the installation plane. Total lengths of the first portion and the second portion are different from each other, and effective height reduction of the entire optical connection component can be achieved by arranging the bent portion in a stepped portion formed by the total length difference.

12 Claims, 9 Drawing Sheets

Related U.S. Application Data application No. PCT/JP2015/072926, filed on Aug. 13, 2015.

(51) Int. Cl.
*G02B 6/42* (2006.01)
*G02B 6/02* (2006.01)
*G02B 6/036* (2006.01)

(52) U.S. Cl.
CPC ........ *G02B 6/02395* (2013.01); *G02B 6/0365* (2013.01); *G02B 6/4249* (2013.01); *G02B 6/4285* (2013.01); *G02B 6/4403* (2013.01)

(56) References Cited

U.S. PATENT DOCUMENTS

| | | | |
|---|---|---|---|
| 5,923,802 | A | 7/1999 | Giebel et al. |
| 6,390,690 | B1 | 5/2002 | Meis et al. |
| D777,681 | S | 1/2017 | Okamoto et al. |
| 2008/0232750 | A1 | 9/2008 | Inaba et al. |
| 2010/0061678 | A1 | 3/2010 | Swinehart et al. |
| 2010/0166373 | A1 | 7/2010 | Nakanishi et al. |
| 2010/0247042 | A1 | 9/2010 | Suzuki et al. |
| 2011/0058772 | A1 | 3/2011 | Bylander |
| 2011/0198765 | A1 | 8/2011 | Sasaki |
| 2012/0155811 | A1 | 6/2012 | Chiang et al. |
| 2015/0177464 | A1 | 6/2015 | Ikeya et al. |
| 2015/0336842 | A1 | 11/2015 | Kaneuchi et al. |
| 2016/0016843 | A1 | 1/2016 | Kaneuchi et al. |
| 2016/0252681 | A1 | 9/2016 | Ishiguro et al. |
| 2016/0291261 | A1 | 10/2016 | Izumi et al. |

FOREIGN PATENT DOCUMENTS

| | | |
|---|---|---|
| JP | 2004-078028 A | 3/2004 |
| JP | 2004-325622 A | 11/2004 |
| JP | 2006-292740 A | 10/2006 |
| JP | 2008-152229 A | 7/2008 |
| JP | 2010-049173 A | 3/2010 |
| JP | 2010-128112 A | 6/2010 |
| JP | 2011-007946 A | 1/2011 |
| JP | 2011-085718 A | 4/2011 |
| JP | 2011-102964 A | 5/2011 |
| JP | 2012-027454 A | 2/2012 |
| JP | 2013-504785 A | 2/2013 |
| JP | 2013-104884 A | 5/2013 |
| JP | 5226797 B2 | 7/2013 |
| JP | 5506322 B2 | 5/2014 |
| JP | 2014-142613 A | 8/2014 |
| WO | 2010/044273 A1 | 4/2010 |
| WO | 2011/031612 A1 | 3/2011 |

OTHER PUBLICATIONS

Office Action dated Nov. 23, 2018 in U.S. Appl. No. 15/883,388 [Related Application; provided in IFW] [Cited in Parent].
Office Action dated Aug. 28, 2018 in U.S. Appl. No. 15/868,249 [Related Application, provided in IFW].
Office Action dated Apr. 25, 2019 in U.S. Appl. No. 15/883,388.

\* cited by examiner

OPTICAL CONNECTION COMPONENT

CROSS-REFERENCE TO RELATED APPLICATIONS

This application is a divisional of U.S. patent application Ser. No. 15/868,249, filed on Jan. 11, 2018, which is a continuation of PCT/JP2015/072926 filed on Aug. 13, 2015, the entire contents of which are incorporated herein by reference.

TECHNICAL FIELD

The present invention relates to a manufacturing method for an optical connection component including a bent optical fiber obtained by partly bending an optical fiber made of silica-based glass.

BACKGROUND ART

Due to miniaturization of an optical module, reducing a height of an optical fiber used in the vicinity of the optical module (suppressing a height from the substrate as for the optical fiber having one end vertically connected to the optical module or the like) is demanded. To reduce the height of the optical fiber, it is necessary to form a bent portion in the optical fiber.

Patent Document 1 discloses an optical fiber component constituted by an optical component body and an optical fiber and having the optical fiber obliquely attached so as to form a certain angle (preferably, 10° or more) with respect to a center line of the optical component body. The Patent Document 1 discloses that: a steep bent portion may be generated in the optical fiber due to oblique attachment of the optical fiber with respect to the center line of the optical component body; there may be a problem in which mechanical reliability of the optical fiber is deteriorated by large distortion caused at the steep bent portion of the optical fiber; and the distortion is removed by heating the steep bent portion in order to secure the mechanical reliability of the optical fiber. Additionally, the Patent Document 1 discloses that discharging, a carbon dioxide gas laser, a gas burner, and the like can be utilized as a heating unit to resolve the distortion.

Patent Document 2 discloses an apparatus to bend an optical fiber by continuously heating a certain range of the optical fiber by using a non-contact heating unit while relatively moving the optical fiber and the non-contact heating unit. Additionally, this Patent Document 2 discloses that arc discharge is suitably used as the non-contact heating unit.

CITATION LIST

Patent Literature

Patent Document 1: Japanese Patent Application Laid-Open No. 2004-325622
Patent Document 2: Japanese Patent No. 5226797

SUMMARY OF INVENTION

Technical Problem

The inventors found following problems as a result of studying the above-described prior art. In other words, in a bent optical fiber having one end portion formed with a bent portion, a fiber fixing component is attached more on a distal end side of the end portion than the bent portion is, and an optical connection component is constituted by these bent optical fiber and fiber fixing component. Therefore, connection between the bent optical fiber and an optical module or the like is achieved by fixing the fiber fixing component attached to the end portion of the bent optical fiber to the optical module or the like.

Basically, height reduction of an optical fiber due to high-density packaging of an optical module may not be sufficient only forming a bent portion at an end portion of the optical fiber, and such height reduction is to be achieved on the basis of a structural and positional relation between a fiber fixing component and a bent optical fiber which constitute an optical connection component. However, above-described Patent Documents 1 and 2 do not disclose anything about a structural and positional relation between an obtained bent optical fiber and a fiber fixing component to be attached to the bent optical fiber.

Furthermore, the bent optical fiber has a structure in which mechanical strength is largely decreased at the bent portion formed at the end portion thereof. In other words, an exposed section of a glass portion of the optical fiber where resin coating has been removed is heated in order to form a bent portion having a predetermined curvature in a state where no bending stress remains, and therefore, a surface of the bent portion becomes fragile. As for this point, the above-described Patent Documents 1 and 2 do not disclose anything about a specific structure to secure sufficient mechanical strength of the bent optical fiber having the end portion thereof attached with the fiber fixing component.

The present invention is made to solve the above-described problems, and is directed to providing an optical connection component having a structure in order to achieve effective height reduction by appropriately setting a structural and positional relation between a bent optical fiber and a fiber fixing component, and furthermore, providing the optical connection component having a structure in order to improve mechanical strength of the bent optical fiber having an end portion thereof attached with the fiber fixing component.

Solution to Problem

To solve the above problems, an optical connection component according to the present embodiment includes a bent optical fiber and a fiber fixing component attached to one end portion of the bent optical fiber and adapted to fix a light input/output surface located on the one end portion side of the bent optical fiber to an optical module including an optical integrated circuit chip and the like. The bent optical fiber is constituted by: a glass portion extending along a predetermined axis; and a resin coating provided on an outer peripheral surface of the glass portion, and furthermore, a bent portion bent at a predetermined curvature in a state where substantially no bending stress remains is formed in an exposed section of the glass portion where a part of the resin coating positioned on the one end portion side of the bent optical fiber is removed. The fiber fixing component includes a holding portion housing a first non-bent section in a state where the first non-bent section is arranged on a predetermined installation plane while exposing the bent portion, and the first non-bent section extends to a position apart from an end surface of the glass portion by a predetermined distance in the exposed section. Particularly, the fiber fixing component includes a first portion and a second portion which constitute the holding portion in a state of being arranged in a manner interposing the installation plane, and a length of the first portion along a longitudinal direction of the holding portion is longer than a length of the second portion along the longitudinal direction of the holding portion. Additionally, in a state where the first non-bent section is housed in the holding portion, the fiber fixing component is fixed to the exposed section of the glass portion such that a second non-bent section positioned on an opposite side of the first non-bent section with respect to the bent portion is arranged in a space where the second portion is positioned with respect to the installation plane.

Advantageous Effects of Invention

According to the present embodiment, it is possible to achieve effective height reduction of the entire optical connection component constituted by the bent optical fiber and the fiber fixing component. In other words, since a difference is provided between the total lengths of the first portion and the second portion which constitute the fiber fixing component, the bent portion is arranged in a stepped portion formed by the total length difference, and as a result, the effective height reduction of the entire optical connection component can be achieved.

DESCRIPTION OF EMBODIMENTS

Details of Embodiment of Present Invention

Description of Embodiment of Present Invention

First, respective aspects corresponding to the embodiment of the present invention will be listed and described.

(1) As an aspect of the present embodiment, an optical connection component includes a bent optical fiber and a fiber connection component. The bent optical fiber is constituted by: a glass portion extending along a predetermined axis; and resin coating provided on an outer peripheral surface of the glass portion. Additionally, in the bent optical fiber, a bent portion bent at a predetermined curvature in a state where substantially no bending stress remains is formed in an exposed section of the glass portion where a part of the resin coating positioned on one end portion side of the bent optical fiber is removed. The fiber fixing component includes a holding portion housing a first non-bent section in a state where the first non-bent section is arranged on a predetermined installation plane while exposing the bent portion, and the first non-bent section extends to a position apart from an end surface of the glass portion by a predetermined distance in the exposed section. Furthermore, the fiber fixing component includes a first portion and a second portion which constitute the holding portion in a state of being arranged in a manner interposing the installation plane, and a length of the first portion along a longitudinal direction of the holding portion is set longer than a length of the second portion along the longitudinal direction of the holding portion. In this structure, in a state where the first non-bent section is housed in the holding portion, the fiber fixing component is fixed to the exposed section of the glass portion such that a second non-bent section positioned on an opposite side of the first non-bent section with respect to the bent portion is arranged in a space where the second portion is positioned with respect to the installation plane. Additionally, as an aspect of the present embodiment, the first portion and the second portion are arranged such that a part of a holding surface of the first portion to hold the first non-bent section directly faces the space where the second non-bent section is arranged. With this structure, the fiber fixing component has a stepped portion where the bent portion is arranged.

(2) As an aspect of the present embodiment, the first portion may include a V-groove substrate having a V-groove to define a position of the first non-bent section on the installation plane and arrange one or a plurality of bent optical fibers, and the second portion may include a lid to define, in cooperation with the V-groove of the V-groove substrate, the position of the first non-bent section formed along a direction orthogonal to the installation plane. As an aspect of the present embodiment, a corner portion of the lid is shaped into a shape, preferably, having a curvature larger than the curvature of the bent portion on a plane including the first non-bent section and orthogonal to the installation plane, and the corner portion of the lid is defined by: a first lid surface facing a surface of the V-groove substrate provided with the V-groove; and a second lid surface which is continued from the first lid surface and faces the space side where the exposed section of the glass portion is positioned. As an aspect of the present embodiment, an interval located in the exposed section of the glass portion and extending along the installation plane from a position exposed from the holding portion of the fiber fixing component to the bent portion is, preferably, 50 [µm] or more and 1 [mm] or less.

As an aspect of the present embodiment, the shaped corner portion of the lid has the curvature of, preferably, 100 [1/mm] or less. As an aspect of the present embodiment, at least a part of the fiber fixing component is made of, preferably, a material that transmits ultraviolet light.

(3) As an aspect of the present embodiment, the glass portion may include a single mode optical fiber (hereinafter referred to as SMF) that contains $SiO_2$ glass as a main component and guarantees single mode transmission at a use wavelength. In this case, the SMF includes at least a core, a first cladding surrounding the core, a second cladding surrounding the first cladding, and a third cladding surrounding the second cladding. Additionally, a relative refractive index difference $\Delta 1$ of the core relative to the third cladding, a relative refractive index difference $\Delta 2$ of the first cladding relative to the third cladding, and a relative refractive index difference $\Delta 3$ of the second cladding relative to the third cladding satisfy relations of $\Delta 1 > \Delta 2 > \Delta 3$ and $\Delta 3 < -0.5$ [%]. Additionally, the product V3 of the relative refractive index difference $\Delta 3$ and a cross-sectional area S of the second cladding is less than $-200$ [%·$\mu m^2$]. As an aspect of the present embodiment, it is preferable that: an interval extending along the installation plane to the second non-bent section from a side surface farthest from the second non-bent section out of side surfaces of the second portion is 5 [mm] or less on a plane including the first non-bent section and orthogonal to the installation plane; the bent portion has a curvature of 0.4 [1/mm] or more; and an excessive loss at the bent portion defined by the sum of a bending loss and a leakage loss is 0.5 [dB] or less at the use wavelength. As an aspect of the present embodiment, a total length of the first non-bent section housed in the holding portion is, preferably, 0.3 mm or more and 1.5 mm or less.

(4) As an aspect of the present embodiment, the optical connection component may further include a potting resin covering a section located in the exposed section of the glass portion and excluding the first non-bent section housed in the holding portion. As an aspect of the present embodiment, a minimum thickness of the potting resin is, preferably, 60 µm or more. As an aspect of the present embodiment, on the plane including the first non-bent section and orthogonal to the installation plane, a contour line defining an outer shape of the potting resin includes, preferably, a curved portion having a curvature of 5/3 [1/mm] or less, that is, a curvature radius R of 0.6 [mm] or more.

Thus, the respective aspects listed in the above "Description of Embodiment of Present Invention" can be applied to all of remaining aspects or to any combinations of these remaining aspects.

Details of Embodiment of Present Invention

In the following, a specific structure of an optical connection component according to the present embodiment will be described in detail with reference to the attached drawings. Note that the present invention is not limited to examples herein and intended to include all modifications within a scope recited in the scope of claims and a meaning equivalent thereto.

Figure 1:
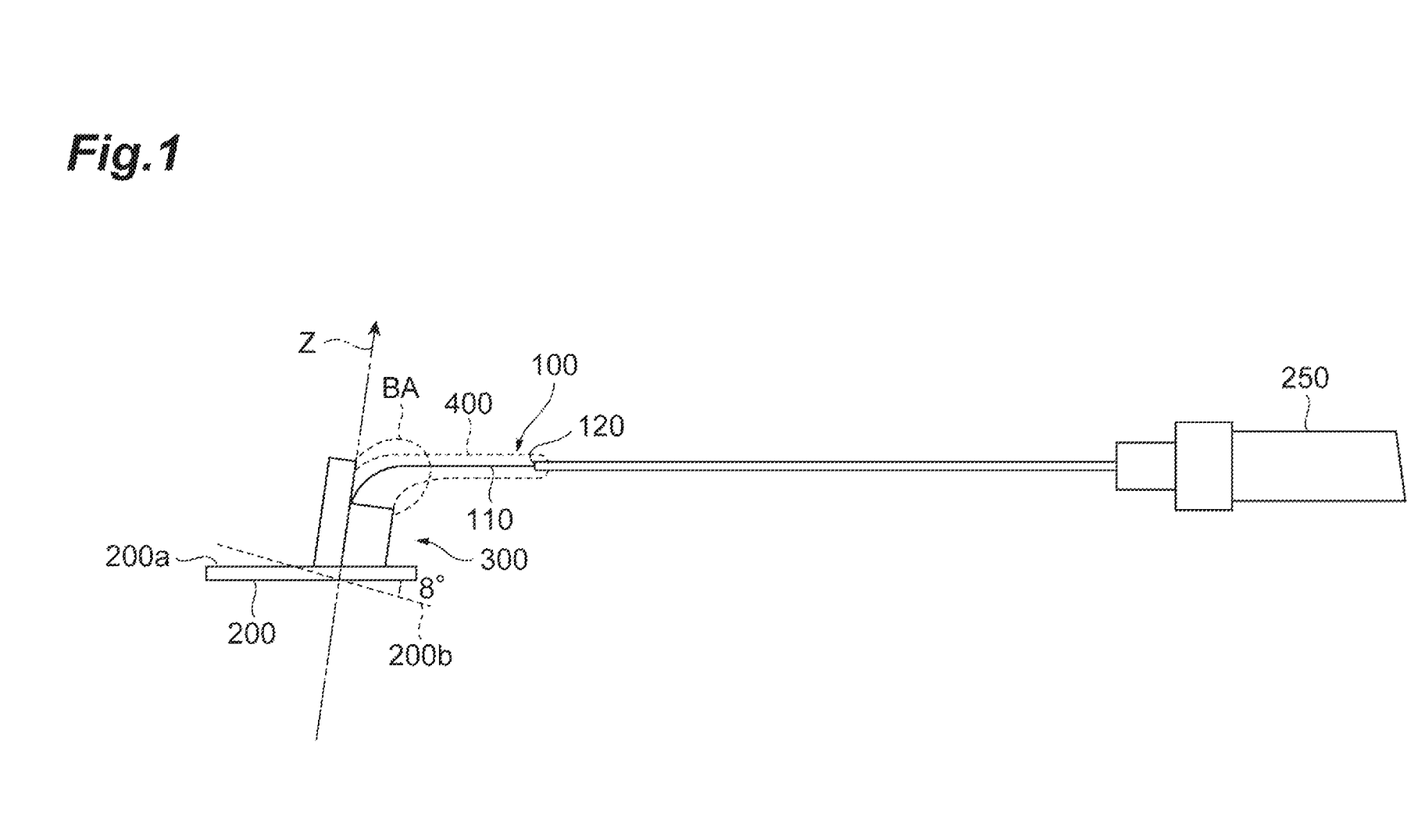
FIG. 1 is a view to describe a use state of an optical connection component according to the present embodiment.

FIG. 1 is a view to describe a use state of the optical connection component according to the present embodiment, and FIG. 1 illustrates an electronic substrate 200 including an optical integrated circuit chip and the like, a bent optical fiber 100 having one end portion formed with a bent portion BA subjected to heat bending processing, a fiber fixing component 300 attached to the one end portion of the bent optical fiber 100 formed with the bent portion BA, a potting resin 400 provided in order to reinforce and protect the bent portion BA in a state being supported by the fiber fixing component 300, and a connector 250 provided in order to optically connect the bent optical fiber 100 to an optical fiber for interconnection wiring or a single mode optical fiber of an external transmission channel (hereinafter referred to as SMF).

In the example of FIG. 1, the bent optical fiber 100 has a glass fiber (bare fiber) 110 and resin coating 120 surrounding the glass fiber 110, and the resin coating 120 is removed at the one end portion formed with the bent portion BA. On the other hand, the connector 250 is attached to the other end portion of the bent optical fiber 100. Furthermore, since a light input/output end surface of the bent optical fiber 100 is optically connected to the optical integrated circuit chip and the like via the fiber fixing component 300, mechanical strength at the connecting portion can be improved. A bottom surface of the fiber fixing component 300 may be inclined by about 8° with respect to an installation surface 200a of the electronic substrate 200 in order to avoid increase of a connection loss caused by reflection on the light input/output end surface of the bent optical fiber 100. In other words, in the example of FIG. 1, a Z-axis indicating a height direction of the fiber fixing component 300 is inclined by about 8° with respect to the installation surface 200a of the electronic substrate 200. Meanwhile, in a case where the bottom surface of the fiber fixing component 300 is not inclined with respect to the height direction (Z-axis direction), the installation surface of the electronic substrate 200 is arranged at a position indicated by a broken line 200b with respect to the Z-axis.

Figure 2A:
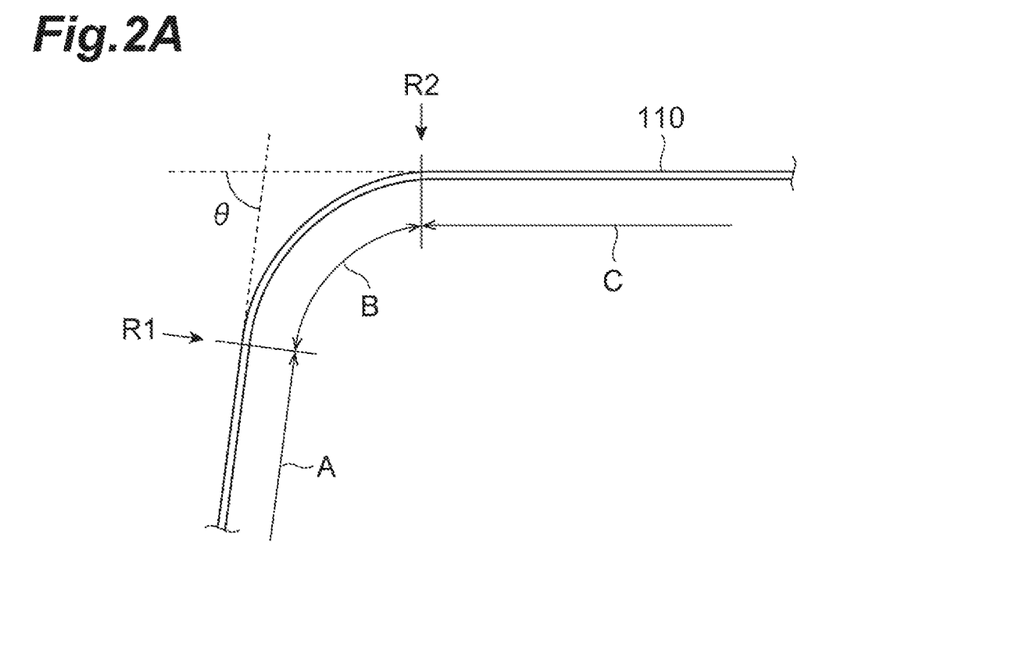
FIGS. 2A and 2B illustrate diagrams to describe an exemplary structure and exemplary curvature distribution of a bent portion and the vicinity thereof of a bent optical fiber applied to the optical connection component according to the present embodiment.
Figure 2B:
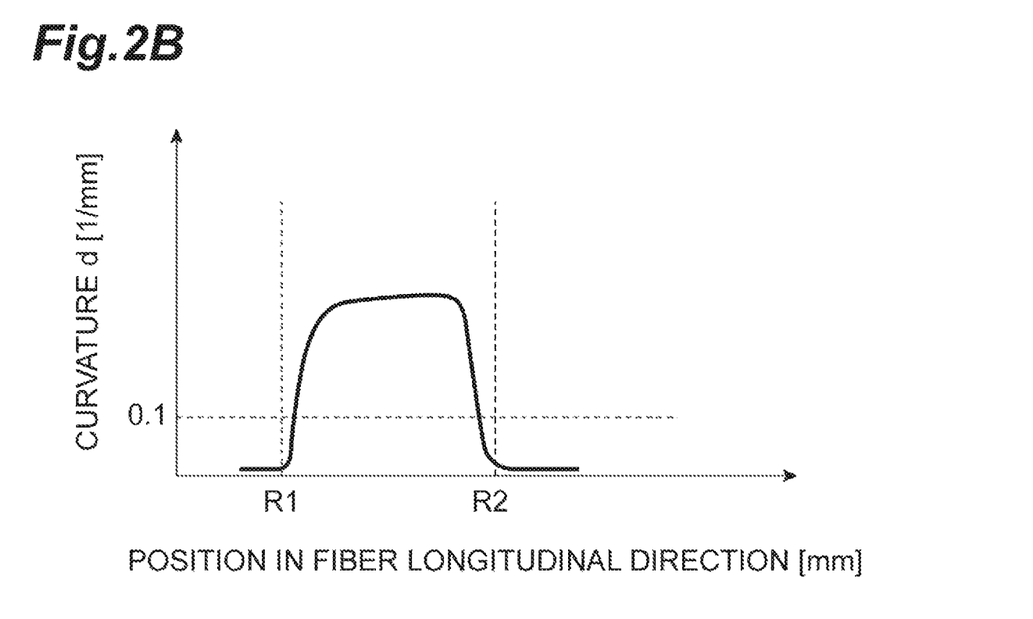

FIGS. 2A and 2B illustrate diagrams to describe an exemplary structure and exemplary curvature distribution of the bent portion and the vicinity thereof (an exposed section where the glass fiber 110 is exposed by removing the resin coating 120) of the bent optical fiber 100 applied to the optical connection component according to the present embodiment. Particularly, FIG. 2A is a view illustrating an exemplary structure of an end portion of the bent optical fiber 100 illustrated in FIG. 1, that is, the vicinity of the bent portion BA formed on the end portion of the glass fiber 110 where the resin coating 120 is removed, and FIG. 2B is a diagram illustrating exemplary curvature distribution of the bent portion BA and the vicinity thereof.

In the present embodiment, as illustrated in FIGS. 2A and 2B, the bent portion BA and the vicinity thereof (end portion of the bent optical fiber 100) are constituted by: a region A having a curvature d of 0.1 [1/mm] or less (first non-bent section continued to the bent portion BA); a region B having a curvature d of 0.4 [1/mm] or more (section corresponding to the bent portion BA and applied with heat bending processing); and region C having a curvature d of 0.1 [1/mm] or less (second non-bent section continued to the bent portion BA). Here, as illustrated in FIG. 2A, since the section applied with the heat bending processing (bent portion BA) keeps a bent shape even without fixing both ends of the section, no bending stress remains in this section. On the other hand, in a section applied with non-heat bending processing, a bent state cannot be kept without fixing both ends of the section, and bending stress constantly remains in the section applied with the non-heat bending processing while the bent state is kept.

Meanwhile, in FIG. 2A, R1 indicates a boundary between the region A and the region B, and R2 indicates a boundary between the region B and the region C, but these regions A to C are continuous sections of the bent optical fiber 100. Additionally, in the present specification, a "bent angle θ" is defined by an angle formed by two straight lines respectively extending along the region A and the region C positioned on both sides of the region B (bent portion BA) as illustrated in FIG. 2A.

A burner, a $CO_2$ laser, arc discharge, a heater, or the like can be used in the heat bending processing to be applied to the region B corresponding to the bent portion BA. The $CO_2$ laser has characteristics advantageous to perform precise control for the curvature distribution because irradiation intensity, an irradiation range, and an irradiation period can be easily adjusted. Since the glass is opaque in the vicinity of a general wavelength 10 [μm] of the $CO_2$ laser, it can be considered that irradiation energy of the $CO_2$ laser is absorbed by a surface layer of the optical fiber and transmitted by re-radiation and heat conduction. In a case where power of the $CO_2$ laser is too high, a surface temperature of the optical fiber is steeply increased up to an evaporation temperature of the glass, and as a result, a surface shape of the optical fiber cannot be maintained. Therefore, irradiation power of the $CO_2$ laser is appropriately adjusted such that: the surface glass of the optical fiber does not evaporate; and distortion is removed by continuously keeping a fiber cross section of a heated portion to have a state where the temperature is increased and held at a temperature of an operating point or more for a predetermined period.

Figure 3:
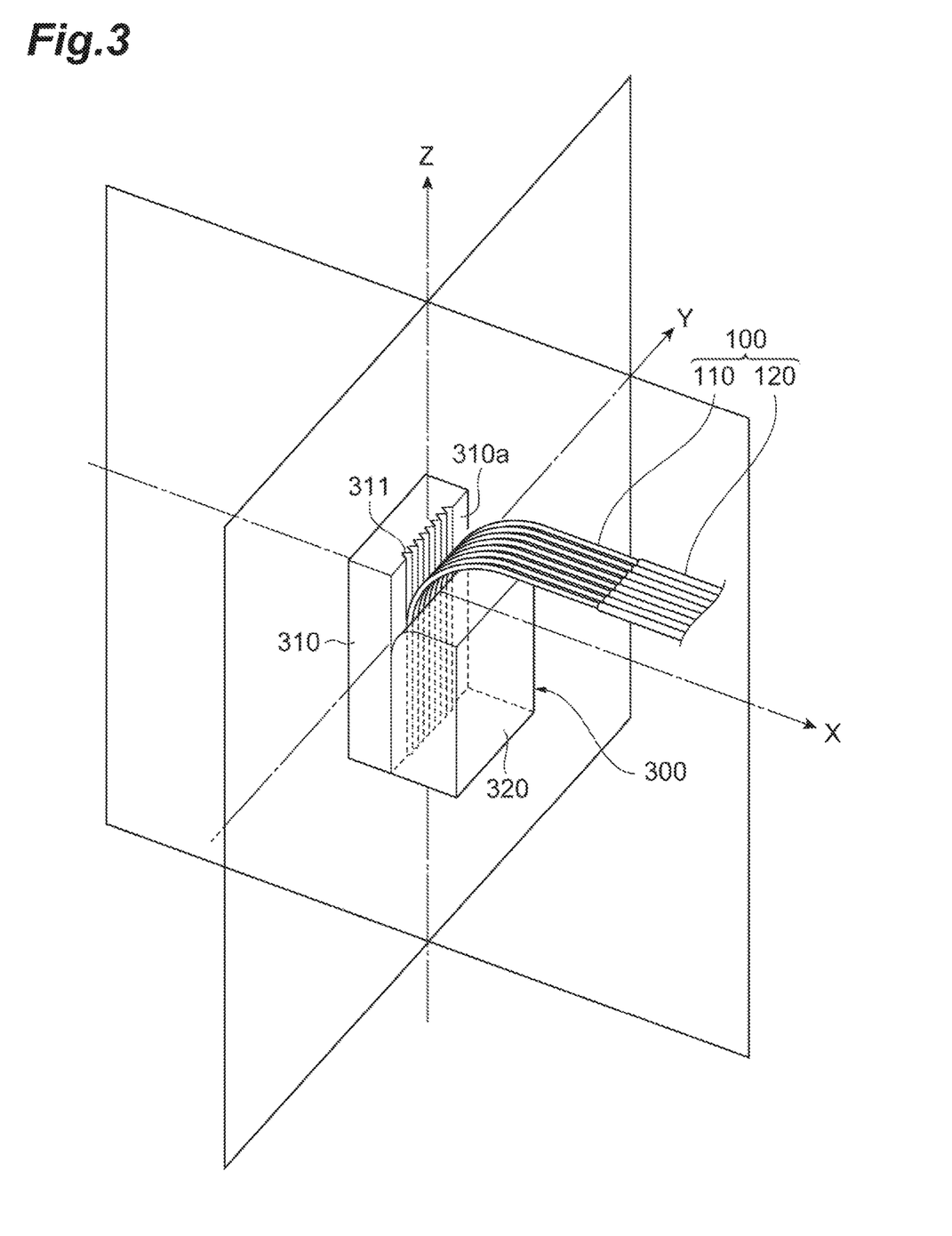
FIG. 3 is a view to describe an arrangement relation of main constituent elements of the optical connection component according to the present embodiment by using a Cartesian coordinate system (XYZ coordinate system).
Figure 4A:
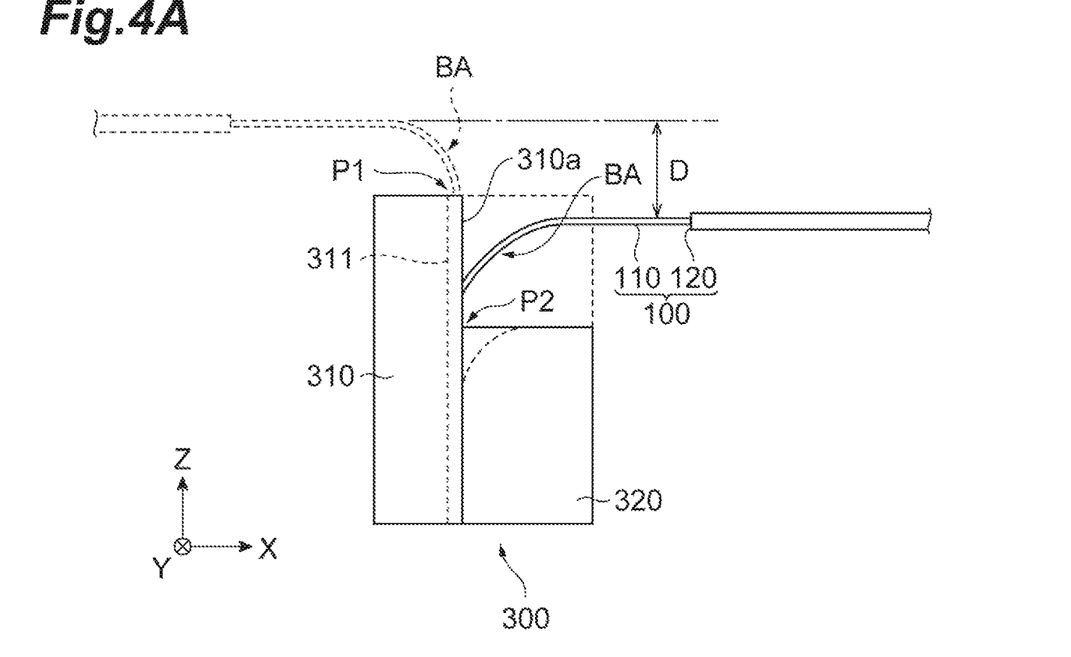
FIGS. 4A and 4B illustrate views to describe a first exemplary structure and exemplary application of the optical connection component according to the present embodiment.
Figure 4B:
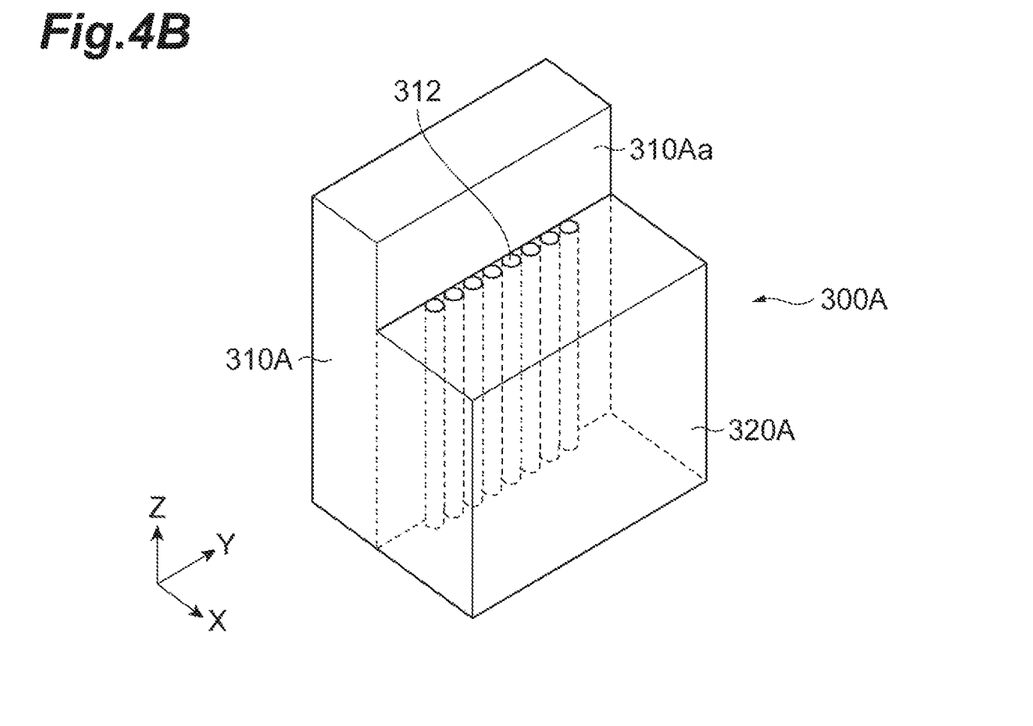

FIG. 3 is a view to describe an arrangement relation of main constituent elements of the optical connection component according to the present embodiment by using a Cartesian coordinate system (XYZ coordinate system). FIG. 4A is a view to describe a first exemplary structure of the optical connection component according to the present embodiment, and FIG. 4B is a view to describe exemplary application of the optical connection component according to the present embodiment.

As illustrated in FIGS. 2A and 2B, the surface of the glass fiber 110 (glass portion) is exposed at one end portion of the bent optical fiber 100 by removing the resin coating 120. In this exposed section, the region B (section corresponding to the bent portion BA) bent at a predetermined curvature is formed in a state where substantially no bending stress remains Additionally, while the fiber fixing component 300 has the structure exposing the region B, the fiber fixing component 300 includes a holding portion to house the region A located in the exposed section (first non-bent section corresponding to the region A extending to a position apart from the end surface of the glass fiber 110 by a predetermined distance in FIG. 2A). Since the region A is housed in the holding portion, the region A is in a state of being arranged on an installation plane corresponding to a Y-Z plane in FIG. 3. Meanwhile, as illustrated in FIG. 3, the fiber fixing component 300 includes a first portion and a second portion which constitute the holding portion in a state of being arranged in a manner interposing the installation plane. In the following description, unless otherwise not particularly specified, the first portion includes a V-groove substrate 310 having a holding surface 310a on which a V-groove 311 to define a position of the region A on the installation plane is formed, and the second portion includes a lid 320 to define, in cooperation with the V-groove 311 of the V-groove substrate 310, the position of the region A along a direction orthogonal to the installation plane. In the case where the fiber fixing component 300 is thus constituted by the V-groove substrate 310 and the lid 320, the holding portion is constituted by: the V-groove 311 formed on the holding surface 310a; and a surface of the lid 320 facing the holding surface 310a.

Furthermore, in the example of FIG. 3, a length of the V-groove substrate 310 along a longitudinal direction of the holding portion (Z-axis direction illustrated in FIG. 3) is set longer than a length of the lid 320 along the Z-axis direction. Additionally, the V-groove substrate 310 and the lid 320 thus having different lengths are arranged in a manner such that a part of the holding surface 310a of the V-groove substrate 310 directly faces a space where the region C positioned on an opposite side of the region A with respect to the region B (second non-bent section that interposes the bent portion BA in cooperation with the first non-bent section) is arranged. As a result, a stepped portion that defines a housing space of the region B is formed in the fiber fixing component 300. In other words, when the fiber fixing component 300 is fixed in the exposed section of the glass fiber 110, the region C positioned on the opposite side of the region A with respect to the region B is arranged in a space where the lid 320 is positioned with respect to the installation plane while the region A is in a state of being arranged in the V-groove 311. With this structure, as illustrated in FIG. 4A, a height of the optical connection component according to the present embodiment is reduced by an amount D compared to a case where the bent portion BA is arranged on the V-groove substrate 310 side (first portion side) with respect to the installation plane (Y-Z plane).

Meanwhile, in the examples of FIGS. 3 and 4A, the fiber fixing component 300 is constituted by two physically separated members of the V-groove substrate 310 and the lid 320, but may also be constituted by a single member. FIG. 4B is a view illustrating a structure of a fiber fixing component 300A constituted by a single member. In FIG. 4B, the fiber fixing component 300A includes a through hole 312 as a holding portion to house an end portion of the bent optical fiber 100, particularly, the first non-bent section corresponding to the region A in the exposed section of the glass fiber 110 where the resin coating 120 is removed. Additionally, the fiber fixing component 300A is constituted by a first portion 310A (portion corresponding to the above-described V-groove substrate 310) and a second portion 320A (portion corresponding to the above-described lid 320) which are arranged in a manner interposing the installation surface (Y-Z plane) where the through hole 312 is provided.

As illustrated in FIG. 4B, in a case of applying the fiber fixing component 300A constituted by the single member including the through hole 312, a ferrule having a structure categorized in a single core connector such as an FC, an SC, and an LC, and a multi-core connector such as an MPO and an MT can be applied as the fiber fixing component 300A. To obtain a merit of height reduction, an exposed region 310Aa is provided by removing a part of a normal ferrule. On the other hand, as illustrated in FIGS. 3 and 4A, in a case where the fiber fixing component 300 is constituted by the V-groove substrate 310 and the lid 320, multi-component glass such as Pyrex (registered trademark), a $SiO_2$ substrate, or the like can be applied as a material of the V-groove substrate 310. However, as for the material of the V-groove substrate 310, it is preferable to use a material that transmits UV light such that the V-groove substrate can be bonded to an optical integrated circuit by using a UV curing resin. Thus, since the fiber fixing component 300 is partly constituted by the material that transmits UV light, bond fixing by the UV curing resin can be achieved, and production efficiency of the optical connection component can be improved.

Next, the bent optical fiber 100 of the optical connection component according to the present embodiment will be described using FIGS. 5A to 5C. Since the bent portion BA having the large curvature d is formed in the bent optical fiber 100, a multi-mode optical fiber (hereinafter referred to as MMF) is generally utilized, but in the following description, an SMF, particularly, an example of a bend insensitive optical fiber (BIF, hereinafter referred to as BI optical fiber) having a trench structure will be described.

In other words, since it is also demanded to reduce a connection loss with the SMF frequently applied to a transmission channel installed in an optical fiber for interconnection wiring such as the bent optical fiber 100 connected to the optical module or the like, there is also enough room to study application of the SMF, not limited to the MMF. Particularly, as the SMF for interconnection wiring installed in a limited space, the BI optical fiber having the trench structure can be expected to reduce a bending loss while suppressing a cutoff wavelength from becoming longer. Therefore, the inventors consider it technically advantageous to apply the BI optical fiber as the bent optical fiber to be inserted as a part of the interconnection wiring between an electronic component in a base station and an external transmission channel (SMF).

However, according to the findings of the inventors, a photo-elastic effect is eliminated while no bending stress remains in the obtained bent optical fiber itself in heat bending processing disclosed in above-described Patent Documents 1 and 2. Therefore, as illustrated in FIG. 5C, an equivalent refractive index in a bent state in a glass region constituting the trench structure becomes higher than an equivalent refractive index in a case of the non-heat bending processing (optical confinement effect provided by the trench structure is reduced). Note that, in FIG. 5C, P100 indicates distribution of an equivalent refractive index of a BI optical fiber including a bent portion having a curvature radius R=2 mm formed by the non-heat bending processing, and P200 indicates distribution of an equivalent refractive index of a BI optical fiber including a bent portion having a curvature radius R=2 mm formed by the heat bending processing. In this case, since the effect of the trench structure (optical confinement effect) in the BI optical fiber is reduced, a bending loss is increased. In other words, in a case of simply applying the SMF, particularly, the BI optical fiber as the bent optical fiber constituting a part of the interconnection wiring, an insertion loss of the bent optical fiber constituted by the BI optical fiber is significantly increased. Therefore, in the following, a structure of the BI optical fiber having the trench structure preliminarily considering elimination of the photo-elastic effect will be described as an example in order that the SMF such as the BI optical fiber can be applied to the bent optical fiber 100 of the present embodiment.

Figure 5A:
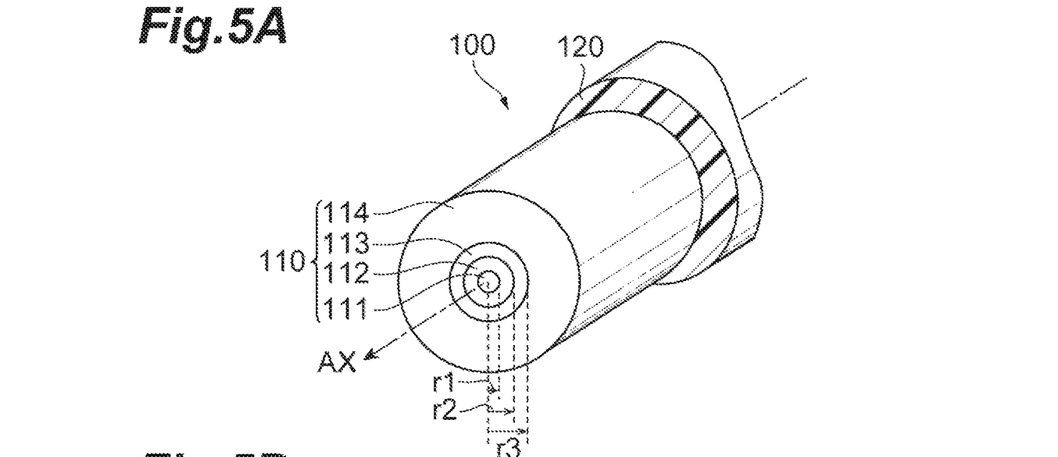
FIGS. 5A to 5C illustrate diagrams to describe an exemplary single mode optical fiber applicable to the optical connection component according to the present embodiment.
Figure 5B:
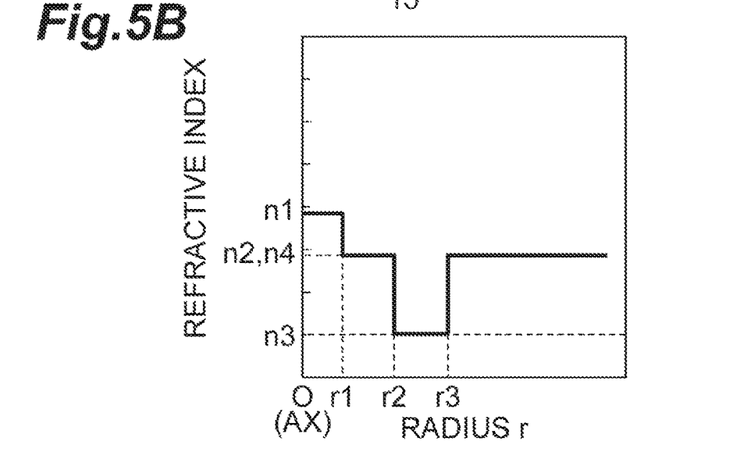
Figure 5C:
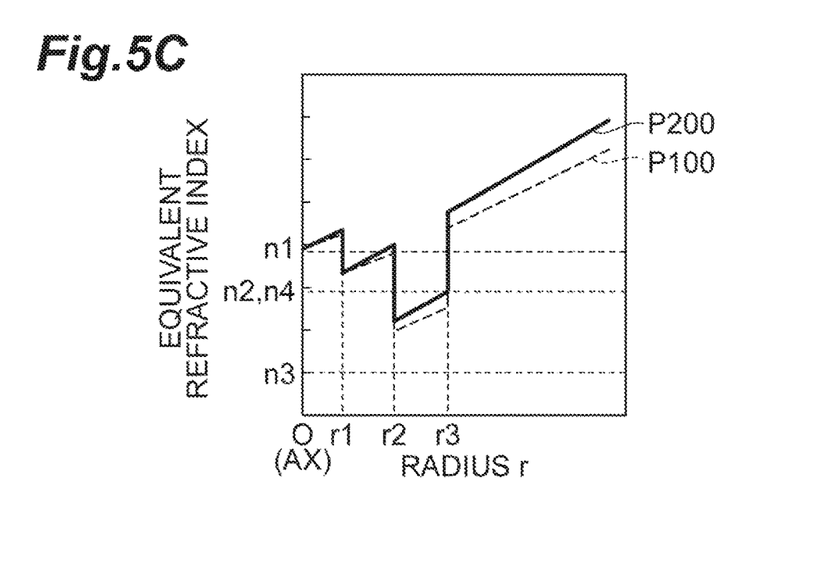

FIG. 5A is a view illustrating a cross-sectional structure of the BI optical fiber as an example of the SMF, FIG. 5B is distribution of a refractive index of the BI optical fiber illustrated in FIG. 5A, and FIG. 5C is distribution of an equivalent refractive index of the BI optical fiber illustrated in FIG. 5A in a state subjected to bending processing.

As illustrated in FIGS. 5A and 5B, the BI optical fiber includes: a core 111 having a radius r1 and extending along a predetermined axis (optical axis AX); first cladding 112 provided on an outer peripheral surface of the core 111 and having a radius r2; second cladding 113 provided on an outer peripheral surface of the first cladding 112 and having a radius r3; and third cladding 114 provided on an outer peripheral surface of the second cladding 113 (region constituting the trench structure of the BI optical fiber). Furthermore, a refractive index of the core 111 is n1, a refractive index of the first cladding 112 is n2 (<n1), a refractive index of the second cladding 113 is n3 (<n2), and a refractive index of the third cladding 114 is n4 (<n1, >n3). Furthermore, a relative refractive index difference Δ1 of the core 111 with respect to the third cladding 114, a relative refractive index difference Δ2 of the first cladding 112 with respect to the third cladding 114, and a relative refractive index difference Δ3 of the second cladding 113 with respect to the third cladding 114 satisfy relations of Δ1>Δ2>Δ3 and Δ3<−0.5 [%]. Additionally, the product V3 of the relative refractive index difference Δ3 and a cross-sectional area S of the second cladding (refractive index volume to define an optimal trench structure) is set to less than −200 [%·μm$^2$] in order to effectively suppress increase of the bending loss caused by elimination of the photo-elastic effect. In the bent optical fiber 100 achieved by forming the bent portion BA having the curvature d of 0.4 [1/mm] or more at one end portion of the BI optical fiber having the above-described structure, an excessive loss in the bent portion BA defined by the sum of a bending loss and a leakage loss is 0.5 [dB] or less at a use wavelength, for example, a wavelength of 1.31 [μm].

A relative refractive index difference (Δ) of each portion while setting the third cladding 114 as a reference is a value determined by an equivalent step index (ESI). An outer diameter of each of the first to third cladding 112, 113, and 114 is determined by utilizing a value obtained by determining a position where a derivative value of radial change of the refractive index becomes maximal near a boundary between cladding and cladding.

Additionally, composition of the BI optical fiber having the above-described structure is manufactured by appropriately adding dopant for refractive index control to $SiO_2$ glass. As an example, the core 111 is made of $SiO_2$ glass to which $GeO_2$ is added, the first cladding 112 is made of pure $SiO_2$ glass, the second cladding 113 constituting the trench structure is made of $SiO_2$ glass to which fluorine is added, and the third cladding 114 is made of pure $SiO_2$ glass. Such glass composition is excellent from the viewpoint of economy and shape controllability. Note that Cl may also be added to the third cladding 114. Additionally, $GeO_2$ and fluorine may be co-doped in the core 111.

It is desirable to have a transmission characteristic equivalent to a general-purpose SMF compliant with the BI optical fiber ITU-TG.652 (hereinafter referred to as SSMF) applied as the bent optical fiber 100 of the optical connection component according to the present embodiment, and connection to another SSMF can be achieved economically with a low loss. In the BI optical fiber having a low bending loss property, MPI generally tends to be high because a bending loss in a high-order mode is low. Therefore, in the present embodiment, a refractive index structure of the core 111 is set such that a cutoff wavelength λc measured at a fiber length 22 m becomes 1260 [nm] or less. Consequently, a BI optical fiber in which the MPI caused by interference with the high-order mode is −30 dB or less can be achieved, and signal quality required for a digital signal can be maintained. Furthermore, in a case where an MFD at a wavelength of 1.31 [μm] is 8.6±0.4 [μm], connection to another SSMF can be achieved with a low loss. Meanwhile, in a case where a fiber diameter (outer diameter of the glass fiber 110) is formed small, distortion at the time of bending the fiber becomes small. In this case, while a housing property is improved, manufacture of a ferrule of an optical connector becomes difficult in a case where a fiber shape is too thin, and therefore, the BI optical fiber applicable to the bent optical fiber 100 of the present embodiment has a glass outer diameter of, preferably, 80 [μm] or more and 125 [μm] or less.

Meanwhile, in the structure as illustrated in FIG. 4A, when tensile stress is applied to the bent optical fiber 100, stress concentrates on the bent optical fiber 100 at a contact portion with the fiber fixing component 300. For example, in the example of FIG. 4A, in a case where the bent portion BA of the bent optical fiber 100 is arranged on the V-groove substrate 310 side with respect to the installation plane, stress concentrates on a portion contacting the corner portion P1 of the V-groove substrate 310. On the other hand, in a case where the bent portion BA of the bent optical fiber 100 is arranged on the installation plane on the lid 320 side with respect to the installation plane, stress concentrates on a portion contacting the corner portion P2 of the lid.

Since the resin coating 120 at the end portion where the bent portion BA is formed is removed, the bent optical fiber 100 has a structure in which mechanical strength in this exposed section, particularly, the bent portion BA is significantly lowered. Therefore, the present embodiment has a structure to protect the vicinity of the bent portion BA. Specifically, the optical connection component according to the present embodiment includes various kinds of structures such as a first protection structure that improves the structure of the fiber fixing component 300 itself and a second protection structure that protects the bent portion BA with a potting resin in order to avoid: increase of an insertion loss caused by stress concentration on the exposed section of the bent optical fiber 100 contacting the corner portions P1 and P2 of the fiber fixing component 300; and damage of the bent optical fiber 100 itself.

Figure 6:
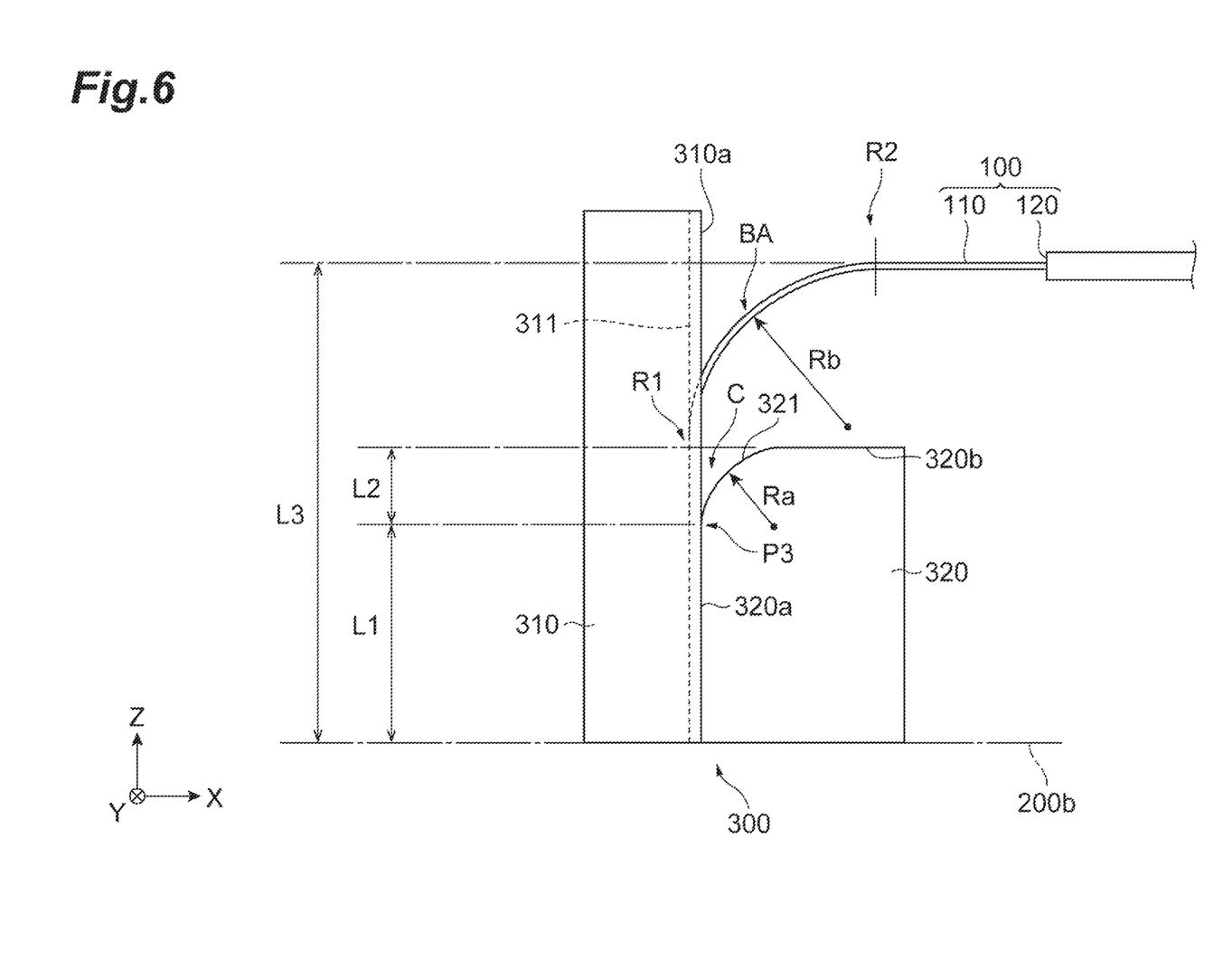
FIG. 6 is a view to describe a second exemplary structure of the optical connection component according to the present embodiment.

FIG. 6 is a view to describe an example including the first protection structure as a second exemplary structure of the optical connection component according to the present embodiment.

The corner portion P2 of the lid 320 illustrated in FIG. 4A is shaped as the first protection structure in the second exemplary structure. In other words, on a plane (X-Z plane) including the region A that is the non-bent section (refer to FIG. 2A) and orthogonal to the installation plane (Y-Z plane), the corner portion P2 of the lid 320 is defined by: a first lid surface 320a facing the holding surface 310a of the V-groove substrate 310 provided with the V-groove 311; and a second lid surface 320b continued to the first lid surface 320a and facing a space side where the region B corresponding to the bent portion BA is positioned. In the present embodiment, the corner portion P2 of the lid is applied with rounding processing so as to have a curved surface 321 having a curvature radius $R_a$ smaller than a curvature radius $R_b$ of the bent portion BA of the bent optical fiber 100 (section corresponding to the region B out of the exposed section of the glass fiber 110). In other words, a curvature (=1/$R_a$ [mm]) of the curved surface 321 positioned at the corner portion P2 of the lid 320 is set larger than a curvature (=1/$R_b$ [mm]) of the bent portion BA. With this structure, when a distal end portion (particularly, the region A) of the bent optical fiber 100 is pressed against the V-groove 311 by the lid 320, a risk such as rupture of the bent optical fiber 100 can be effectively reduced even in a case where unexpected tensile stress is applied to the bent optical fiber 100, for example, when the position of the lid 320 is changed by hardening shrinkage of a fixing adhesion bond at the time of bonding and fixing the fiber fixing component 300 onto the electronic substrate 200.

Meanwhile, a length L1 of the region A housed in the holding portion constituted by the V-groove 311 of the V-groove substrate 310 and the lid 320 is, preferably, 0.3 mm or more and 1.5 mm or less. Furthermore, an interval L2 extending along the installation plane to the bent portion BA from a start position of exposure of the exposed section of the glass fiber 110, that is, the position where the glass fiber is exposed from the holding portion of the fiber fixing component 300 (contact end of the V-groove substrate 310 and the lid 320) is, preferably, 50 [μm] or more and 1 [mm] or less. More preferably, L2 is 500 [μm] or less. An interval along the installation plane to the region C from a side surface farthest from the region C of the bent optical fiber 100 out of side surfaces of the lid 320, namely, a total height L3 of the optical connection component is, preferably, 4 [mm] or less. The curvature d of the bent portion BA is, preferably, 0.4 [1/mm] or more. The reason is to prevent the total height of the optical connection component from being unnecessarily high. Additionally, a curvature radius of the shaped curved surface 321 of the lid 320 positioned at the corner portion P2 is, preferably, 10 [μm] or more (curvature d=100 [1/mm] or less) in order to obtain an effect of avoiding stress concentration on the bent optical fiber 100.

Furthermore, a light entrance/exit end surface of the bent optical fiber 100 to which the fiber fixing component 300 is fixed may have a certain angle with respect to a fiber axis (optical axis AX illustrated in FIG. 5A). For example, a large reflection loss with a light source, a light receiver, and a waveguide connected to the bottom surface of the fiber fixing component 300 can be largely taken by inclining the light input/output end surface by 8[°] with respect to the fiber axis, and stable transmission performance can be achieved.

Next, a third exemplary structure of the optical connection component according to the present embodiment including the second protection structure will be described. Meanwhile, FIG. 7A is a perspective view illustrating an optical connection component according to the third exemplary structure in which the exposed section of the bent optical fiber 100 is protected by the potting resin 400 as an example of the second protection structure, and FIG. 7B is a view illustrating a bottom surface structure of the fiber fixing component 300.

Figure 7A:
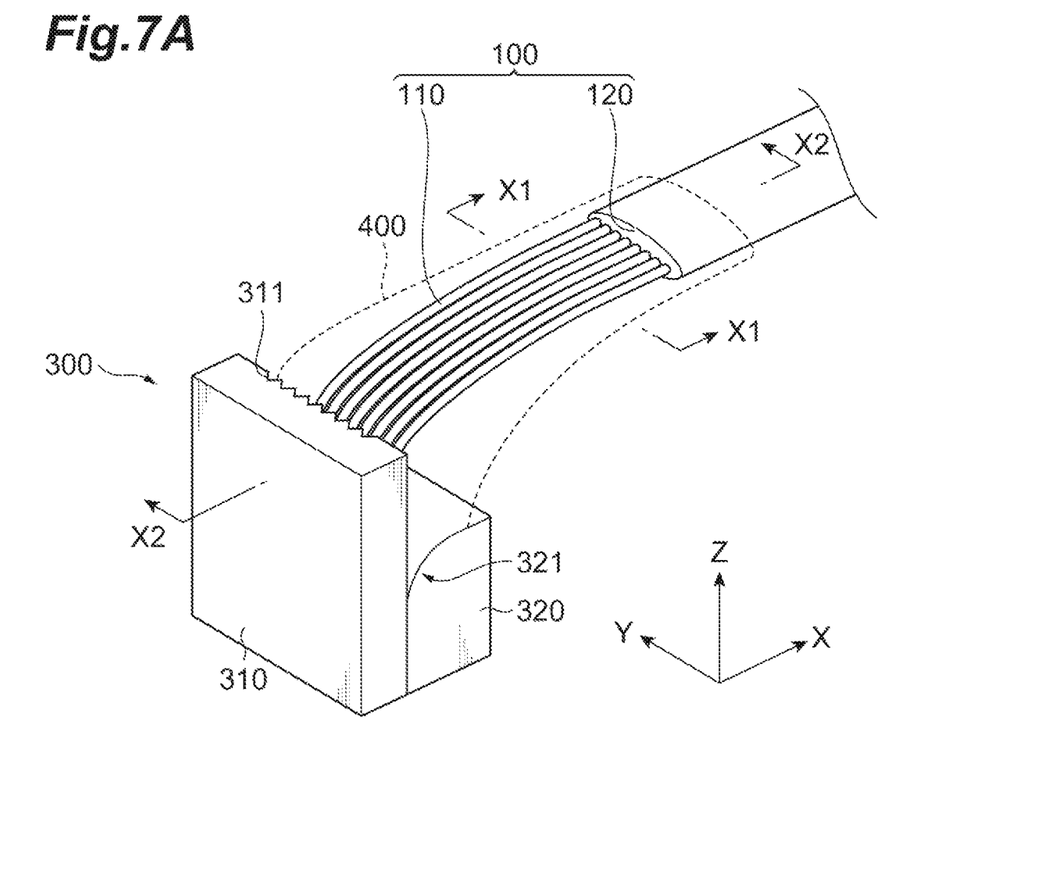
FIGS. 7A and 7B illustrate views to describe a third exemplary structure of the optical connection component according to the present embodiment.
Figure 7B:
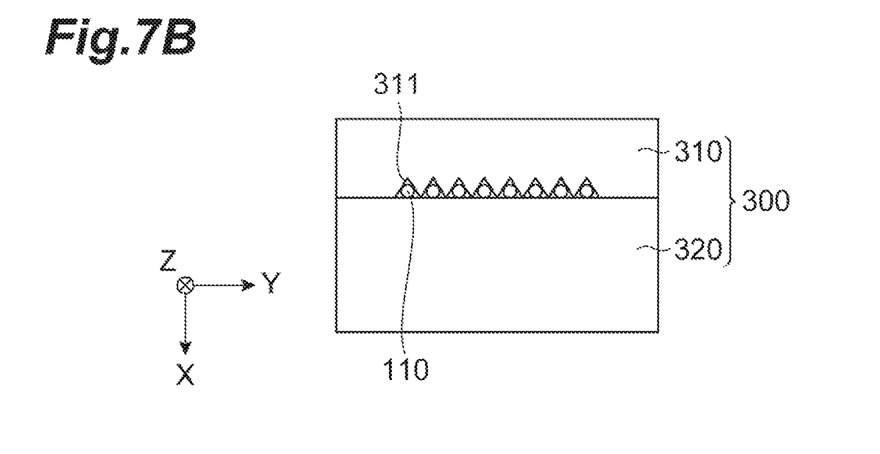
Figure 8A:
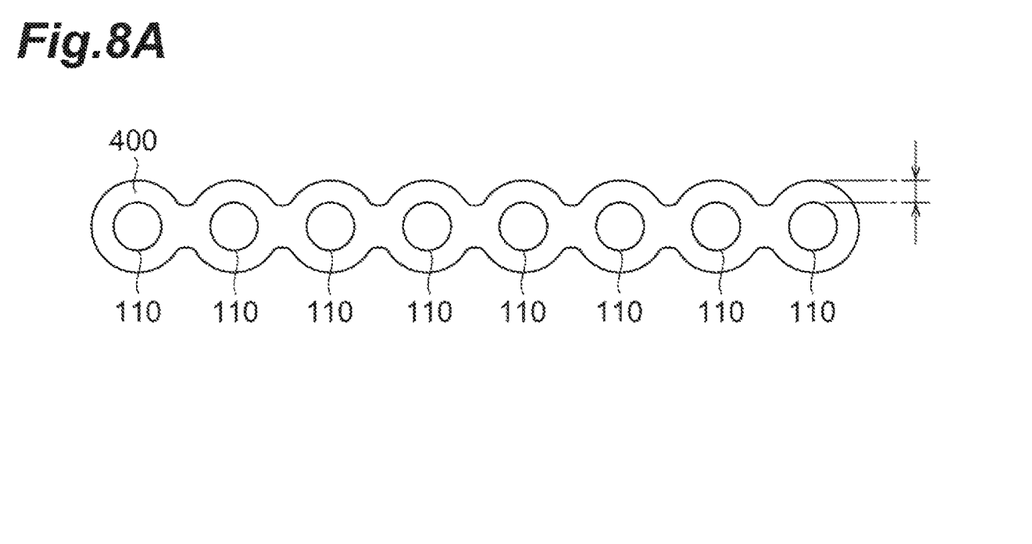
FIGS. 8A and 8B illustrate views of cross-sectional structures respectively taken along lines X1-X1 and X2-X2 illustrated in FIGS. 7A and 7B of the third exemplary structure of the optical connection component according to the present embodiment.
Figure 8B:
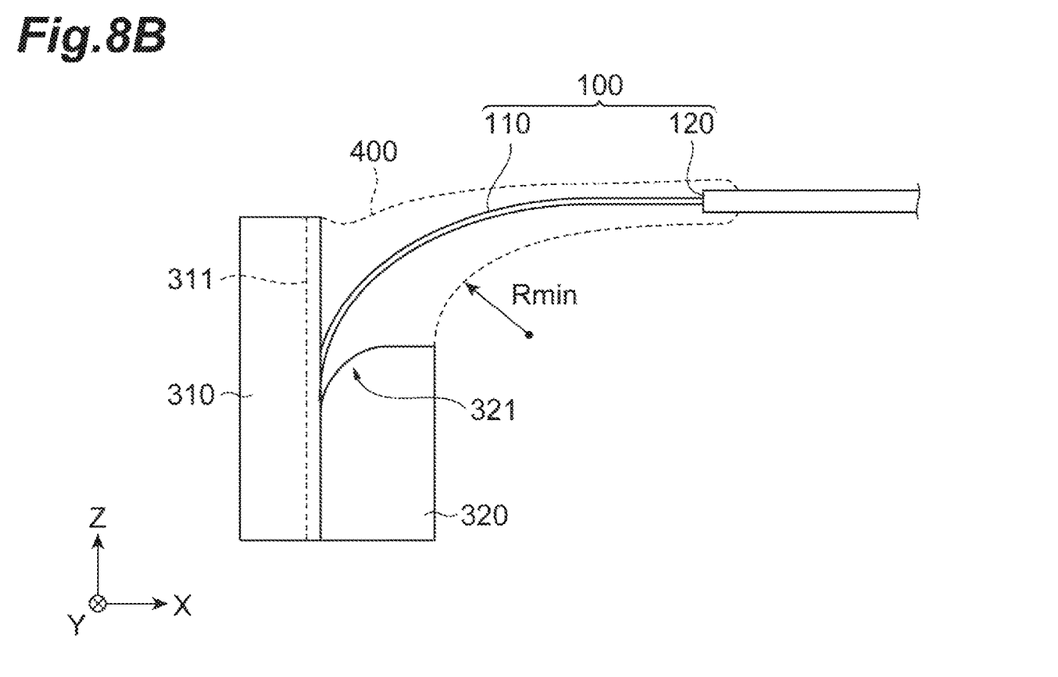

Additionally, FIGS. 8A and 8B illustrate views to describe structural features of the potting resin 400, and particularly, FIG. 8A is a view illustrating a cross-sectional structure taken along a line X1-X1 (line on the Y-Z plane) in FIG. 7A, and FIG. 8B is a view illustrating a cross-sectional structure taken along a line X2-X2 (line on the X-Z plane) in FIG. 7A.

The potting resin 400 is tightly fixed to the holding surface 310a of the V-groove substrate 310 and the second lid surface 320b of the lid 320 in a state of entirely covering the exposed section of the bent optical fiber 100 (the surface of the glass fiber 110 where the resin coating 120 is removed), particularly, the section exposed from the fiber fixing component 300. Since the entire end portion of the bent optical fiber 100 formed with the bent portion BA is thus covered with the potting resin 400 firmly fixed to the fiber fixing component 300, deformation of the bent optical fiber 100 can be suppressed to a certain level or less even when stress is applied to the bent optical fiber 100, and as a result, breakage of the bent optical fiber 100 caused by excessive deformation can be effectively avoided.

Meanwhile, the potting resin 400 has strength equivalent to a Young's modulus of 2.0 MPa or more and functions so as not to allow main stress of 250 MPa or more to be applied to the bent portion BA of the bent optical fiber 100. Additionally, needless to mention, the potting resin 400 also has a function to prevent damage of the bent optical fiber 100 caused by direct contact. As a preferable structure, the potting resin 400 may have strength equivalent to a Young's modulus of 3.5 MPa or more. As a material of the potting resin 400, for example, a UV curing resin can be considered, but not limited thereto.

Furthermore, as illustrated in FIG. 8A, a minimum thickness of the potting resin 400 is, preferably, 60 μm or more. This is to avoid direct exposure of the glass fiber 110 in the section where the resin coating 120 is removed, and maintain protection strength.

Figure 9:
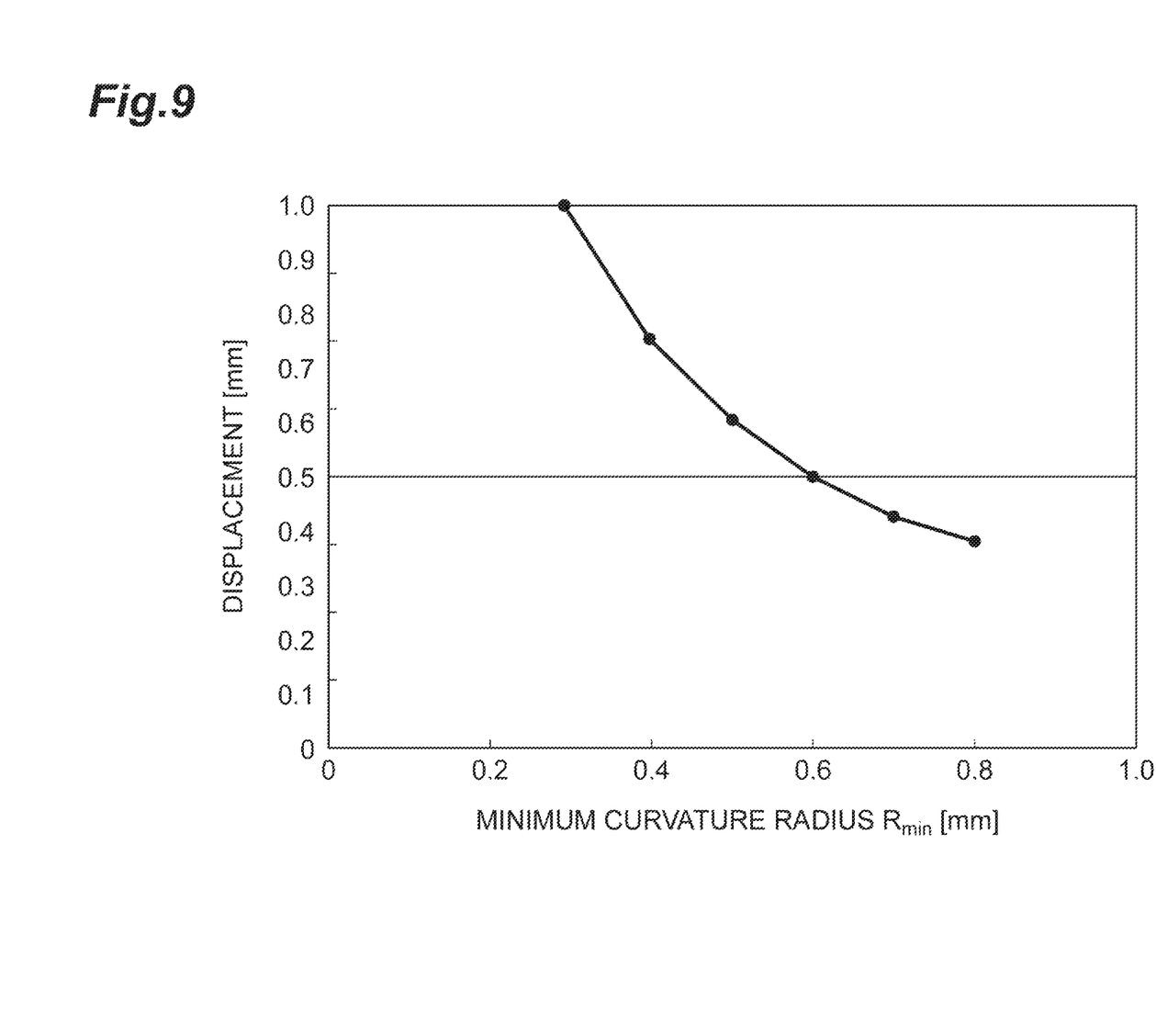
FIG. 9 is a graph illustrating a relation between a minimum curvature radius $R_{min}$ [mm] and displacement [mm] of the bent optical fiber at the time of applying a predetermined tension in the third exemplary structure of the optical connection component according to the present embodiment.

FIG. 9 is a graph illustrating a relation between a minimum curvature radius $R_{min}$ [mm] and displacement [mm] of the bent optical fiber at the time of pulling the other end portion of the bent optical fiber 100 (the side to which the connector 250 is attached) with tension of 10 N in the above-described third exemplary structure. Meanwhile, as illustrated in FIG. 8B, the minimum curvature radius $R_{min}$ represents a minimum curvature radius out of curvature radii at a curved portion included in a contour line of the potting resin 400 defined on the plane (X-Z plane) including the region A positioned at the end portion of the bent optical fiber 100 and orthogonal to the installation plane (Y-Z plane). As it can be grasped from the graph of FIG. 9, the minimum curvature radius $R_{min}$ is, preferably, 0.6 [mm] or more in order to suppress displacement of the bent portion BA to 0.5 [mm] or less such that a risk of rupture of the bent optical fiber 100 is reduced. In other words, the contour line defining an outer shape of the potting resin 400 includes a curved portion having a curvature d of, preferably, 5/3 [1/mm] or less in order to suppress displacement of the bent portion BA to 0.5 [mm] or less.

REFERENCE SIGNS LIST

100 . . . Bent optical fiber; 110 . . . Glass fiber (bare fiber); 111 . . . Core; 112 . . . First cladding; 113 . . . Second cladding; 114 . . . Third cladding; BA . . . Bent portion; 300 . . . Fiber fixing component; 310 . . . V-groove substrate; 311 . . . V-groove; 320 . . . Lid; 320a . . . First lid surface; and 320b . . . Second lid surface.

The invention claimed is:

1. An optical connection component comprising:
a bent optical fiber constituted by: a glass portion; and a resin coating provided on an outer peripheral surface of the glass portion, the bent optical fiber having an exposed section where a part of the resin coating located on one end portion side of the bent optical fiber is removed and the glass portion is exposed, the exposed section includes a bent portion, a first non-bent section, and a second non-bent section, the bent portion being bent in a state where substantially no bending stress remains, the first non-bent section locating at a distal end of the bent optical fiber, and the first non-bent section and the second non-bent section interposing the bent portion therebetween; and
a fiber fixing component having a holding portion housing the first non-bent section in a state where the first non-bent section is arranged on an installation plane while exposing the bent portion, the first non-bent section extending to a position apart from an end surface of the glass portion,
wherein the fiber fixing component includes a first portion and a second portion which constitute the holding portion in a state of being arranged in a manner interposing the installation plane,
a length of the first portion along a longitudinal direction of the holding portion is longer than a length of the second portion along the longitudinal direction of the holding portion,
the second non-bent section is arranged in a space where the second portion is positioned with respect to the installation plane,
the first portion includes a V-groove substrate having a V-groove to define a position of the first non-bent section on the installation plane,
the second portion includes a lid to define, in cooperation with the V-groove of the V-groove substrate, a position of the first non-bent section along a direction orthogonal to the installation plane, and
the lid has a corner portion defined by: a first lid surface facing a surface of the V-groove substrate provided with the V-groove; and a second lid surface which is continued from the first lid surface and faces the space side where the exposed section is positioned, the corner portion having a curvature larger than the curvature of the bent portion on a plane including the first non-bent section and orthogonal to the installation plane.

2. The optical connection component according to claim 1, wherein
the first portion and the second portion are arranged such that a part of a holding surface of the first portion to hold the first non-bent section directly faces the space where the second non-bent section is arranged.

3. The optical connection component according to claim 1, wherein
an interval located in the exposed section and extending along the installation plane from a position exposed from the holding portion of the fiber fixing component to the bent portion is 50 μm or more and 1 mm or less.

4. The optical connection component according to claim 1, wherein
the corner portion has a curvature of 100 or less in units of 1/mm.

5. The optical connection component according to claim 1, wherein
at least a part of the fiber fixing component is made of a material transmitting ultraviolet light.

6. The optical connection component according to claim 1, wherein
an interval extending along the installation plane to the second non-bent section from a side surface farthest from the second non-bent section out of side surfaces of the second portion is 5 mm or less on a plane including the first non-bent section and orthogonal to the installation plane,
the bent portion has a curvature of 0.4 or more in units of 1/mm, and
an excessive loss at the bent portion defined by a sum of a bending loss and a leakage loss is 0.5 dB or less at a use wavelength.

7. The optical connection component according to claim 3, wherein
the corner portion has a curvature of 100 or less in units of 1/mm.

8. The optical connection component according to claim 2, wherein
the first portion includes a V-groove substrate having a V-groove to define a position of the first non-bent section on the installation plane, and
the second portion includes a lid to define, in cooperation with the V-groove of the V-groove substrate, a position of the first non-bent section along a direction orthogonal to the installation plane.

9. The optical connection component according to claim 8, wherein
the lid has a corner portion defined by: a first lid surface facing a surface of the V-groove substrate provided with the V-groove; and a second lid surface which is continued from the first lid surface and faces the space side where the exposed section is positioned, the corner portion having a curvature larger than the curvature of the bent portion on a plane including the first non-bent section and orthogonal to the installation plane.

10. The optical connection component according to claim 9, wherein
an interval located in the exposed section and extending along the installation plane from a position exposed from the holding portion of the fiber fixing component to the bent portion is 50 μm or more and 1 mm or less.

11. The optical connection component according to claim 9, wherein
the corner portion has a curvature of 100 or less in units of 1/mm.

12. The optical connection component according to claim 10, wherein
the corner portion has a curvature of 100 or less in units of 1/mm.

* * * * *